United States Patent [19]

Noda

[11] Patent Number: 4,548,370

[45] Date of Patent: Oct. 22, 1985

[54] FISHING REEL CLUTCH ACTUATOR

[75] Inventor: Hideo Noda, Sakai, Japan

[73] Assignee: Shimano Industrial Company Limited, Osaka, Japan

[21] Appl. No.: 567,056

[22] Filed: Dec. 30, 1983

[30] Foreign Application Priority Data

Jan. 8, 1983 [JP] Japan .................................. 58-1208

[51] Int. Cl.⁴ ............................................. A01K 89/02
[52] U.S. Cl. .................................... 242/211; 242/218; 242/84.53
[58] Field of Search ................ 242/84.4, 84.41, 84.42, 242/84.53, 211, 212, 213, 214, 216, 217, 218, 219; 192/67 R, 93

[56] References Cited

U.S. PATENT DOCUMENTS

| 625,166 | 5/1899 | Hastings | 242/211 |
|---|---|---|---|
| 781,776 | 2/1905 | Leaver | 242/211 X |
| 1,172,422 | 2/1916 | Benjamin | 242/84.53 |
| 1,189,232 | 7/1916 | Benjamin | 242/214 X |
| 1,507,638 | 9/1924 | Verhey | 242/84.53 |
| 2,390,356 | 12/1945 | Dileo | 242/84.53 X |
| 2,984,433 | 5/1961 | Clark | 242/213 X |
| 4,142,694 | 3/1979 | Rankin | 242/211 |
| 4,179,084 | 12/1979 | Noda | 242/212 |
| 4,232,842 | 11/1980 | Noda | 242/217 X |

FOREIGN PATENT DOCUMENTS 22420 of 1913 United Kingdom ............... 242/84.5

Primary Examiner—Stuart S. Levy
Assistant Examiner—Joseph J. Hail, III
Attorney, Agent, or Firm—Stevens, Davis, Miller & Mosher

[57] ABSTRACT

A fishing reel is provided with a spool, a drive mechanism for driving the spool, a clutch mechanism for freely rotating the spool with respect to the drive mechanism, and a clutch operating mechanism for operating the clutch mechanism. A clutch lever at the clutch operating mechanism is supported to a second side frame opposite to a first side frame carrying a handle at the drive mechanism. When the operating member is pushed to move the clutch lever to the termination position of the forward movement for disconnecting the clutch mechanism, the finger tip of an angler's hand for operating the operating member is adapted to be positioned in the vicinity of the outer surface of the spool, thereby enabling the angler's finger to stop the rotation of the spool in continuation of the push operation of the operating member.

6 Claims, 4 Drawing Figures 4,548,370

FISHING REEL CLUTCH ACTUATOR

FIELD OF THE INVENTION

This invention relates to a fishing reel, and more particularly, to a fishing reel which supports a spool rotatably between first and second side frames at a reel body, drives the spool by a drive mechanism having a handle supported to the first side frame, allows the spool to freely rotate with respect to the drive mechanism, and operates a clutch mechanism by a clutch operating mechanism.

BACKGROUND OF THE INVENTION

Generally, the aforesaid fishing reel has been called a double bearing reel and is well-known. The clutch operating mechanism provides a clutch lever slidably supported to the first side frame carrying the handle and an operating segment exposing from the outer surface of the reel body is provided at the fore end of the clutch lever, so that the operating segment is pushed to disconnect the clutch mechanism to allow the spool to freely rotate for casting.

During casting, an angler grips with one hand, i.e., his not-whip-hand, a reel mounting portion at a fishing rod and a second side frame opposite to the first side frame carrying the handle, and rotates the handle with his whip hand to wind up a fishing line to bring a fishing rig at the end thereof near the tip of fishing rod. Then his whip hand is released from the handle and transferred to grip the rod therewith, thus performing the casting by swinging the rod.

Prior to swinging of the rod, the angler pushes the operating segment to disconnect the clutch mechanism and presses by his finger the outer periphery of the spool thereby stopping its rotation, because a fishing rig, unless the spool is stopped, allows the spool to rotate freely by the weight of the rig so that the rig near the tip of the fishing rod will fall down.

Since the conventional reel provides the operating segment for the clutch lever at the first side frame carrying the handle, the angler, when intending to operate the operating segment by the finger of his whip hand gripping the rod, has to forcibly bring the thumb toward the back of his hand for pushing the operating segment. Also, since the operating segment is provided away from the spool, a time difference occurs between the push of the operating segment and the stop of the spool carried by the same thumb, whereby the fishing rig shifts from the proper position with respect to the rod. As a result, the problem is created in that the casting is improper.

SUMMARY OF THE INVENTION

In the light of the above problem, this invention has been designed. An object of the invention is to provide a fishing reel in which it is easy to operate the operating segment for the clutch lever in such a manner that the angler during casting naturally extends the thumb of his whip hand gripping the fishing rod forwardly of the palm and operates the operating segment; and also almost simultaneously he can stop the rotation of the spool.

In order to attain the above object, this invention provides the clutch lever at the second frame opposite to the first frame carrying the handle and in proximity to the spool.

Accordingly, the angler can operate the operating segment to disconnect the clutch mechanism mainly by the thumb of his whip hand gripping the fishing rod for casting, and simultaneously stop the spool by the same thumb. Thus, the fishing rig is held at the optimum position always for proper casting.

It is preferable for positioning the angler's thumb which operates the operating segment, in the vicinity of the outer periphery of the spool, that the operating segment extends toward the spool, and also to project the operating segment inwardly from the end face of the second frame and further to provide a recess receiving the operating segment when the clutch lever is pushed.

These and other objects of the invention will become more apparent in the detailed description and examples which follow.

DETAILED DESCRIPTION OF THE INVENTION

Figure 1:
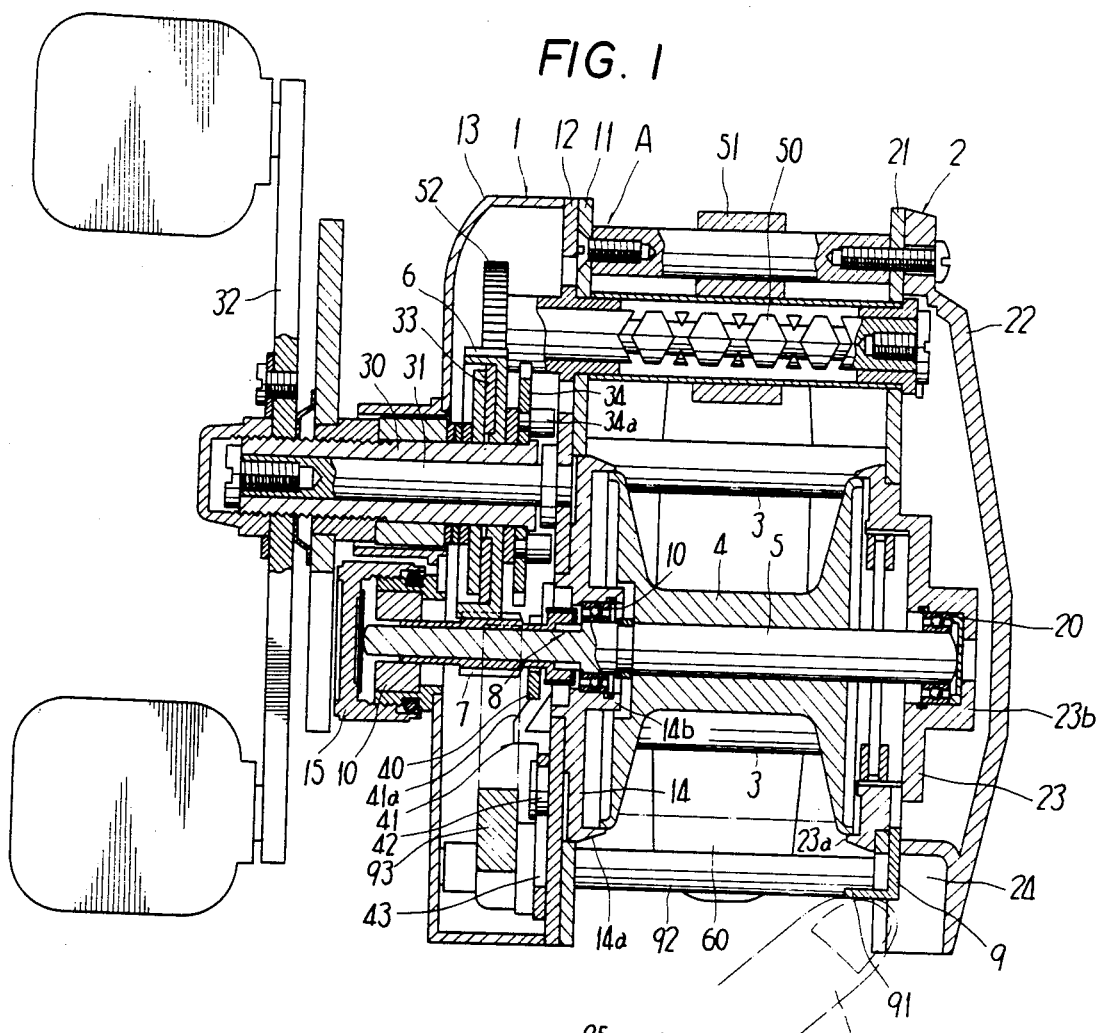
FIG. 1 is a sectional plan view of an embodiment of a fishing reel of the invention.
Figure 2:
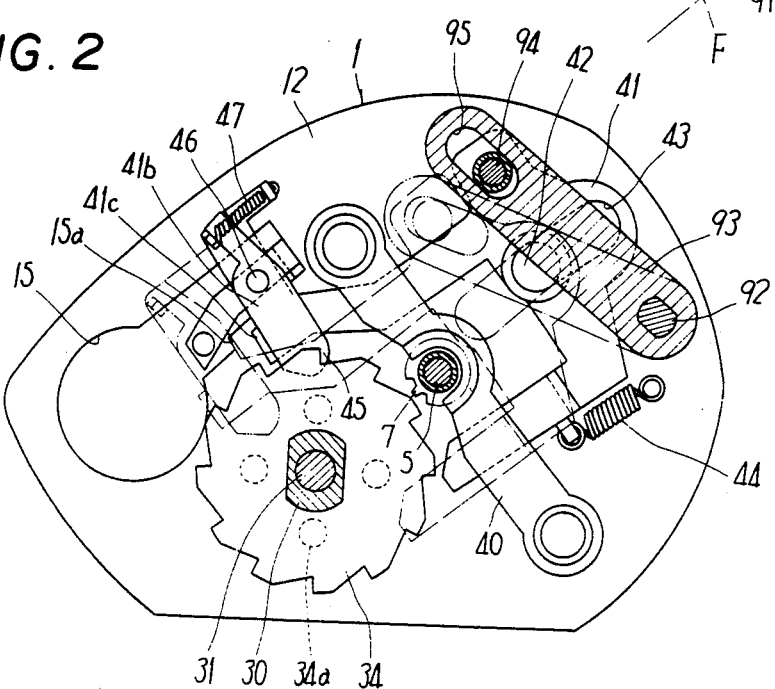
FIG. 2 is a partially omitted left-hand side view of the FIG. 1 embodiment.

Referring to FIG. 1, a fishing reel comprises a reel body A comprising: a first side frame 1 comprising a side plate 11, a doubling plate 12 attached to the outside thereof, and a bowl-like-shaped cover 13 attached to the outside of doubing plate 12; a second side frame 2 comprising a side plate 21 and a bowl-like-shaped cover 22; and a plurality of connecting rods 3 for connecting the first and second side frames 1 and 2. A spool shaft 5 having a spool 4 is supported freely rotatably between the first and second side frames 1 and 2. A handle shaft 30 having a master gear 6 is supported rotatably between the doubling plate 12 and the bowl-like-shaped cover 13 through a support shaft 31. A handle 32 is fixed to one end of handle shaft 30 projecting outwardly from the cover 13. A pinion 7 engageable with the master gear 6 is supported rotatably and slidably to the extension of spool shaft 5 entering the cover 13. A clutch mechanism 8 is provided between the pinion 7 and the spool shaft 5, so that a clutch operating mechanism having a clutch lever engages or disengages the clutch mechanism 8. The clutch mechanism 8 engages to transmit a rotating force from the handle 32 to the spool 4 through the handle shaft 30, master gear 6, pinion 7, clutch mechanism 8, and spool shaft 5, thereby rotating the spool 4. Also, the clutch mechanism 8 disengages to allow the spool 4 to freely rotate.

Also, bearing housings 14, 15 and 23 are incorporated in the central portions of side plates 11 and 21 and cover 13. Bearing housings 14 and 23 at the side plates 11 and 21 are provided at the outer peripheries with larger diameter cylinders 14a and 23a and at the central portions with cylindrical smaller-diameter bearing housings 14b and 23b respectively, the housings 15, 14b and 23b including therein bearings 10 and 20 respectively.

The master gear 6 is freely rotatably fitted onto the handle shaft 30 entering in the cover 13, and a friction plate 33 and an anti-reverse-rotation plate 34 having a plurality of projections 34a are fitted not-rotatably onto the same so that the rotational force is adapted to be transmitted from the handle shaft 30 to the master gear 6 through the friction plate 33.

Clutch mechanism 8 comprises a flat face provided at an intermediate portion of spool shaft 5 and a cylindrical portion having a not-round inner surface engageable with the flat face. The clutch lever 9 is operated to disengage the cylindrical portion at the pinion 7 from the flat portion at the spool shaft 5, thereby allowing the spool shaft 5 and spool 4 to freely rotate.

The clutch operating mechanism comprises the clutch lever 9 having an operating segment 91, a clutch yoke 40 carrying the pinion 7 and biasing the clutch mechanism 8 normally in the engaging direction, a bifurcated operating plate 41 having a push 41a, and the anti-reverse-rotation plate 34. Operating plate 41 is supported to the doubling plate 12 at the first side frame 1 in relation of being reciprocable perpendicularly with respect to the spool shaft 5 through a pin 42 and an elongate slot 43. The operating plate 41 is pushed to move the clutch yoke 40 axially and the pinion 8 in the direction of disconnecting the clutch mechanism 8. Also, the handle 32 is rotated to hit a contact 45 at the utmost end of operating plate 41 by the projection 34a at the anti-reverse-roatation plate 34, the operating plate 41 being returned by a return spring 44 to thereby move the pinion 7 by a biasing force of clutch yoke 40 in the direction of engaging the clutch mechanism 8. In addition, the operating plate 41 is swingable around the pin 42 and is provided at the utmost end with an engaging portion 41b, so that the engaging portion 41b engages with a stepped portion 15a at a cutout 15 formed at the doubling plate 12, thereby holding the operating plate 41 at the termination of its forward movement.

The contact 45 is pivoted to the operating plate 41 through a pin 46 and biased unidirectionally by a spring 47 provided between the pin 46 and the operating plate 41 and restrained by a stopper 41c from moving in the biasing direction. In addition, the handle shaft 30, handle 32, master gear 6, and friction plate 33 constitute a drive mechanism for the spool 4.

Figure 3:
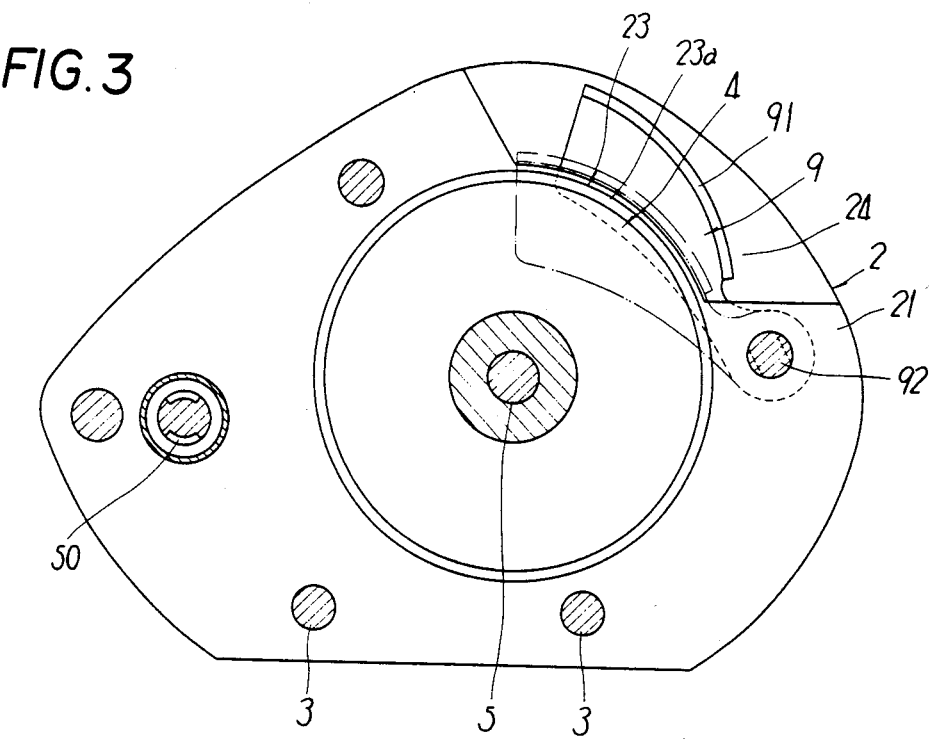
FIG. 3 is a partially omitted longitudinal sectional left-hand side view thereof.
Figure 4:
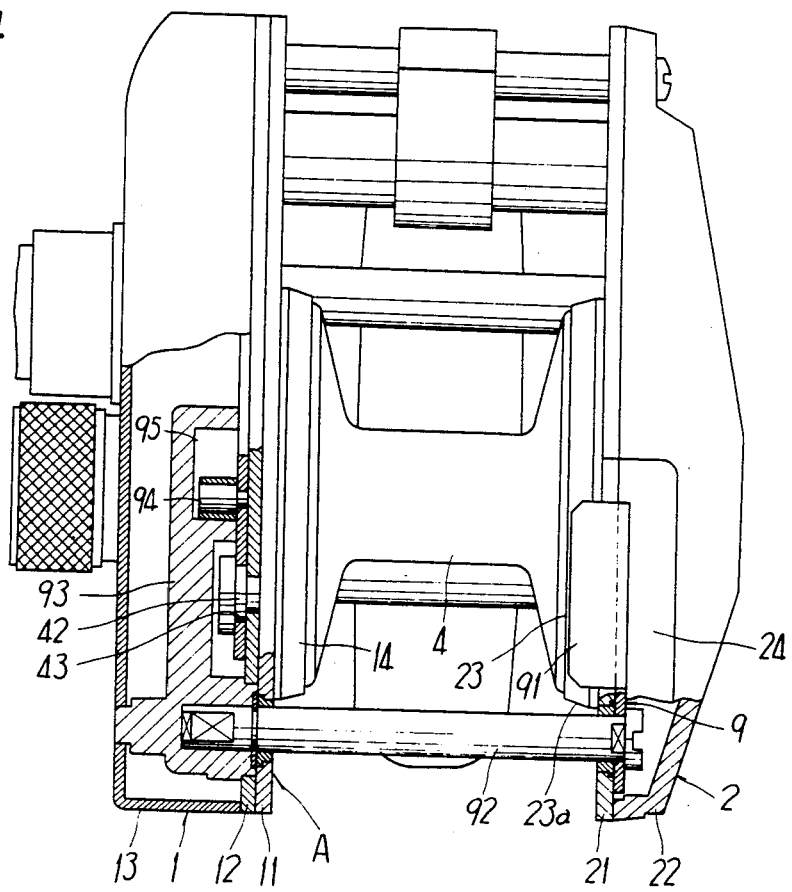
FIG. 4 is a partially cutaway plan view of the same.

The fishing reel of the invention constructed as foregoing supports the clutch lever 9 at the second frame 2 so that when the clutch lever 9 is pushed, the operating segment 91 therefor is positioned in the vicinity of the outer surface of spool 4 as shown by the chain line in FIG. 3.

In the drawing, the clutch lever 9 enters at one end into the second side frame 2 from the rear thereof and is mounted to one end of an interlocking lever 92 entering the second side frame 2, the interlocking lever 92 being supported rotatably between the first and second side frames 1 and 2. Also, the clutch lever 9 is provided at the end projecting outwardly from the second side frame 2 with the operating segment 91 extending forwardly thereof and bending toward the spool 4 to be positioned thereabove, so that the operating segment 91 approaches the thumb of the angler's hand gripping the fishing rod. A recess 24 for receiving operating segment 91 is provided opposite thereto and in proximity to the outer periphery of the larger diameter cylinder 23a at the bearing housing 23, so that the operating segment 91 further approaches the outer periphery of the flange at the spool 4. An arm 93 is mounted not-rotatably to the projecting end of interlocking lever 92 entering into the first side frame and interlocks at the utmost end with the operating plate 41 through a pin 94 and an elongate slot 95 to thereby transmit an operating force of clutch lever 9 to the operating plate 41 and disconnect the clutch mechanism 8. Also, the return spring 44 acts to move the operating plate 41 backwardly, and the clutch lever 9 restores the same.

In addition, the outer edge of second side frame 2 near the clutch lever 9 supporting position approaches the larger diameter cylinder 23a as shown, where it is advantageous that the operating segment 91 further approach the outer periphery of the flange. In this case, the outer edge of side plate 21 approaches the outer periphery of bearing housing 23, and the outer edge of cover 22 is bent in about L-like shape. Also the recess 24 is provided at the clutch lever support position and moves at the outer edge close to the bearing housing 23, so that the operating segment 91 is preferred to be disposed in the recess 24 not to project outwardly from the outermost edge of second side frame 2. Alternatively, the outer edge of second side frame 2 near the clutch lever supported position, instead of the recess 24, may approach as a whole the outer periphery of bearing housing 23.

In addition, in FIG. 1, reference numeral 50 designates a traverse shaft journalled between the side plates 11 and 21, and 51 designates a fishing line guide sleeved onto the traverse shaft 50 and axially reciprocable thereon. 52 designates a transmission gear in mesh with the master gear 6 to transmit the rotation of handle shaft 30 to the traverse shaft 50.

The fishing reel constructed as foregoing is mounted to the fishing rod through a mounting leg 60 provided between the first and second side frames 1 and 2. The angler grips the reel mounting portion at the rod and second side frame 2 by his not-whip-hand and the handle 32 by the whip hand, thereby rotating the handle 32 to wind up the fishing rig in proximity to the tip of the rod. Thereafter, he transfers the rod to his whip hand and pushes the operating segment 91 by the finger at his whip hand to disconnect the clutch mechanism 8 and about simultaneously stops the free rotation of spool 4 and then cast the rig. In this case, he extends the thumb F of his whip hand gripping the rod, natually toward the second side frame 2, and brings the inner surface of his thumb tip into contact with the operating segment to make easy the push control thereof. Moreover, the operating segment 91, when the clutch lever 9 is pushed to be positioned at the termination of forward movement thereof, is positioned in the vicinity of the outermost layer of fishing line wound onto the spool 4 so that the tip of thumb F pushing the operating segment 91 approaches the outermost layer of wound line to an extent of almost contacting therewith. Hence, the tip of thumb F can immediately be transferred from the operating segment 91 to the outermost layer of wound line. As a result, the free rotation of spool 4 can be stopped about simultaneously with the disconnection of clutch mechanism 8. Accordingly, the fishing rig is restricted to a maximum from falling down by its weight, thereby permitting desired casting.

Alternatively, the handle 32 and clutch lever 9 may be provided at the second side frame 2 and the first one 1 to form a right-hand handle type reel. Also, the clutch mechanism 8 may be provided at the second side frame 2 carrying the clutch lever 9. In a case where the clutch mechanism 8 is provided at the first side frame 1 as shown, the means for transmitting the operating force from the clutch lever 9 to the operating plate 41 is not particularly defined. Also, the operating segment 91 may be sloped at the bent end radially inwardly of the spool 4. Thus, the angler's thumb F is further quick to transfer from the operating segment 9 to the spool 4.

As seen from the above, the fishing reel of the invention provides at the second side frame opposite to the first side frame carrying the handle the clutch lever having the operating segment therefor, whereby the angler extends the finger, mainly the thumb, of his whip hand gripping the rod, forwardly of the palm in a natural posture, thereby operating the operating segment exactly and readily for casting.

Furthermore, the operating segment, when the clutch lever is pushed thereby to be positioned at the termination of its forward movement, is adapted to be positioned in proximity to the outer periphery of the flange of the spool, the angler's finger F can immediately be transferred from the operatting segment to the flange of the spool, thereby stopping the rotation thereof almost simultaneously with the disconnection of the clutch mechanism to always permit desired casting.

While an embodiment of the invention has been shown and described, the invention is not limited to the specific construction thereof, which is merely exemplary in the specification rather than defined.

What is claimed is:

1. A fishing reel comprising a reel body having first and second side frames, a spool disposed between said side frames at said reel body, a drive mechanism supported to said first side frame and having a handle for driving said spool, a clutch mechanism for freely rotating said spool with respect to said drive mechanism, and a clutch operating mechanism for operating said clutch mechanism, said clutch operating mechanism having an operating member and a clutch lever to disconnect said clutch mechanism responsive to pushing of said operating member, said clutch lever and said operating member being fixedly mounted on a first end of an interlocking lever and laterally supported solely to said second side frame opposite to said first side frame carrying said handle so that when said clutch lever is pushed to a termination position at which said clutch mechanism is disconnected, said operating member is positioned in close proximity to an outer surface of said spool, whereby a user can use his thumb of his hand which grips a rod to which said reel is attached to stop free rotation of said spool in continuation of pushing said operating member with said thumb without changing his grip on said rod, wherein said clutch mechanism is provided at said first side frame and includes a clutch operating plate, said interlocking lever is rotatably disposed between said first and second side frames, said first end of said interlocking lever having mounted thereon said clutch lever, said reel further comprising means disposed on a second end of said interlocking lever and cooperating with said interlocking lever to actuate said clutch operating plate to disconnect said clutch mechanism responsive to pushing of said operating members, said interlocking lever being journaled on said first and second side frames at positions intermediate said first and second ends of said interlocking lever, and wherein said second side frame comprises a recess for receiving said operating member when said clutch lever is pushed.

2. A fishing reel according to claim 1, wherein said clutch operating mechanism comprises a clutch operating plate, said clutch operating plate being housed in said first side frame and for cooperating with said clutch mechanism, and an interlocking mechanism disposed between said clutch operating plate and said clutch lever.

3. A fishing reel according to claim 1, wherein said operating member for said clutch lever extends toward said spool.

4. A fishing reel according to claim 3, wherein said operating member for said clutch lever projects inwardly from an end face of said spool at a side of said second side frame.

5. A fishing reel according to claim 1, wherein said operating member is elongated and is pivoted to said second side frame to extend forwardly in its elongated dimension relative to said second side frame and is positioned above said spool, and said clutch lever is pivoted to a rear side of said second side frame opposite to said first side frame carrying said handle, said operating member being positioned entirely within an outer extremity of said second side frame.

6. A fishing reel according to claim 1, wherein said second side frame includes a recess in which said operating member is disposed so that said operating member is positioned entirely within an outer extremity of said second side frame.

* * * * *